July 3, 1951 L. H. SMITH ET AL 2,558,791
METHOD OF PRINTING THERMOPLASTIC SHEETS
Filed Nov. 5, 1947
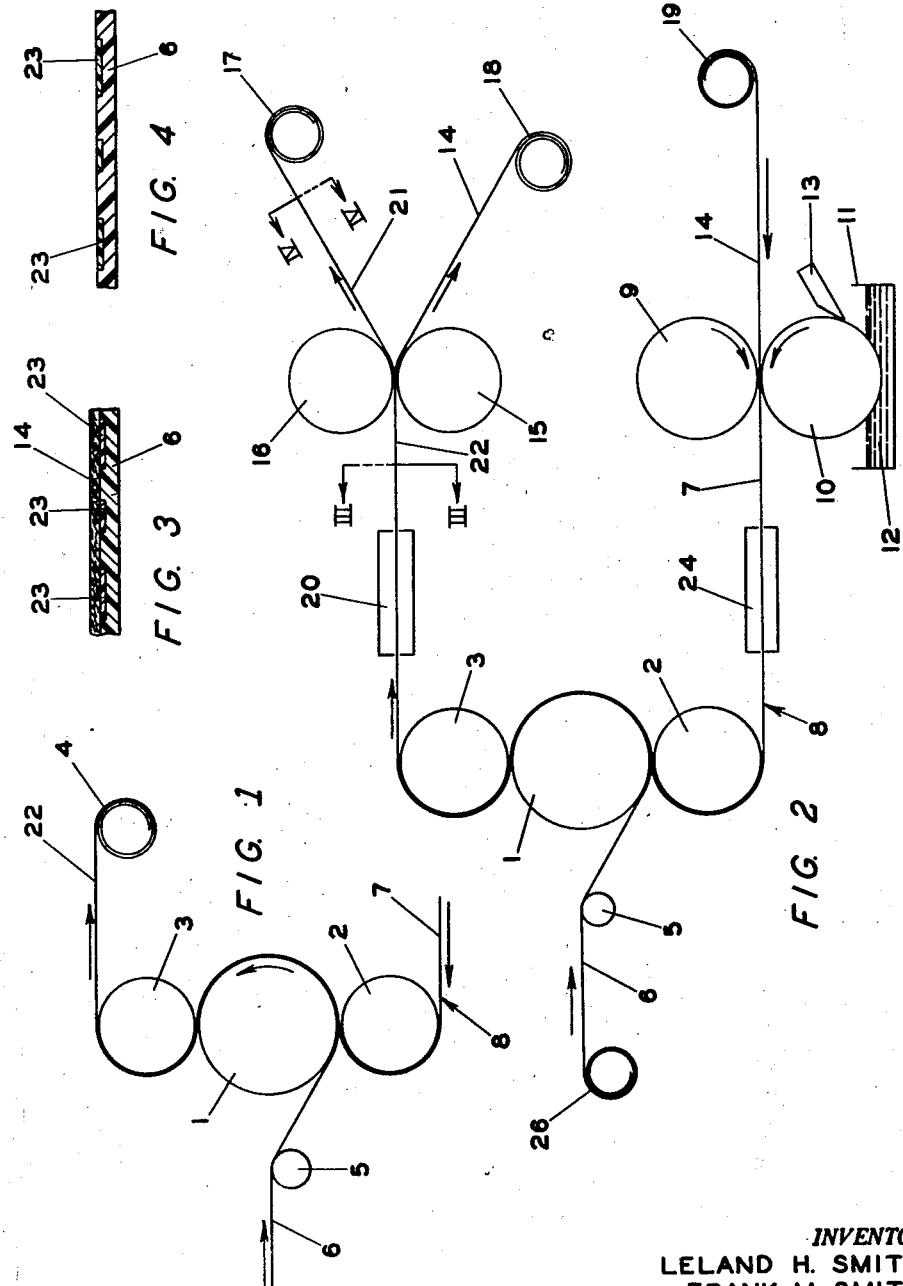
INVENTOR.
LELAND H. SMITH
BY FRANK M. SMITH
Dean Lawrence
ATTORNEY

Patented July 3, 1951

2,558,791

UNITED STATES PATENT OFFICE 2,558,791

METHOD OF PRINTING THERMOPLASTIC SHEETS

Leland H. Smith and Frank M. Smith, Granville, N. Y., assignors to The Decora Corporation, Fort Edward, N. Y., a corporation of New York Application November 5, 1947, Serial No. 784,118

1 Claim. (Cl. 154—99)

The present invention relates to a method for printing on a thermoplastic sheet, particularly to a method for printing on a thin, elastic, thermoplastic sheet of polyvinyl chloride with a thermoplastic printing composition having a polyvinyl chloride base to secure accurate register of design and without deformation of the sheet, and to a transfer sheet useful in the method.

The printing of thin thermoplastic sheets, such as foil or film made by calendering plasticized polyvinyl chloride and co-polymers thereof, is accomplished only with considerable technical difficulty. Many inks used for printing on plastic sheets wear rapidly or become tacky upon standing and may even smudge when printing is carried out in conventional manner. Although some success has been attained in the printing of plastic sheets which are substantially non-elastic, such as sheets of cellulose acetate and cellulose nitrate, the difficulties encountered are far greater when attempts are made to print on elastic thermoplastic sheets, such as calendered polyvinyl chloride sheets. Most thermoplastic sheets, particularly thin thermoplastic sheets, such as can be made by calendering high molecular weight plasticized polyvinyl chloride composition, are somewhat elastic and tend to creep and to be deformed when fed between conventional printing rolls. Such deformation is usually of a permanent nature and the result is entirely unsatisfactory. When it is attempted to print with two or more colors on the same thermoplastic sheet, imperfect register of pattern is invariably obtained using heretofore known processes.

An additional disadvantage encountered heretofore in the printing of plastic sheets has been the difficulty of obtaining inks which adhere sufficiently to the sheet to be free from undue wear or even from parting or peeling from the surface of the sheet. Attempts have been made to use thermoplastic inks and, subsequently, to heat the printed thermoplastic sheet to bond the ink with the sheet, but difficulty has been experienced, not only as mentioned previously, but also with the bleeding of the ink during the heating process. Furthermore, it is practically impossible to heat a thin, thermoplastic sheet carrying a thermoplastic ink sufficiently to bond the ink to the sheet by heretofore known means without causing a great deal of deformation, or even fusion, of the sheet itself. It is apparent that a convenient and economical method which can be carried out continuously for printing a thermoplastic sheet with a thermoplastic ink to produce a printed sheet having a smooth surface wherein the pattern is in perfect register and the ink is thoroughly bonded to the sheet would be of great value.

It is, therefore, an object of the present invention to provide a method for printing a thermoplastic sheet.

An additional object is to provide a method for printing a flexible, a plasticized, thermoplastic polyvinyl chloride sheet with a thermoplastic printing composition wherein the composition is bonded securely to the sheet to provide a smooth, printed surface.

An additional object is to provide a method for printing a thin, plasticized, thermoplastic polyvinyl chloride sheet wherein the printed design is characterized by sharp definition and accurate register.

An additional object is to provide a method for decorating a calendered sheet of plasticized polyvinyl chloride by the application and bonding thereto of a resinous decorating composition having a polyvinyl chloride base.

An additional object is to provide a decorated or printed, flexible plasticized polyvinyl chloride sheet characterized by a high degree of register in the design and by integral bonding of the design-forming printing composition with the sheet.

An additional object is to provide a transfer sheet useful in printing a thermoplastic sheet.

These and related objects are accomplished readily and economically by first printing the desired design in intaglio and in reverse on a flexible, substantially non-elastic sheet, variously referred to herein as a backing, carrier or transfer sheet, using a printing composition or ink comprising a polyvinyl chloride as hereinafter described. A non-elastic sheet is chosen having a surface to which the printing composition adheres only indifferently. The printed surface of the non-elastic sheet is then preheated and contacted under at least moderate pressure, with the surface of a flexible, thermoplastic polyvinyl chloride sheet on which it is desired to have the printing appear. The non-elastic sheet and the printing composition thereon are heated just prior to contacting with the thermoplastic sheet to a temperature, herein referred to as the "bonding temperature," sufficient to soften the printing composition on the sheet and cause it to bond with the thermoplastic sheet upon pressure contact therewith. The non-elastic sheet is usually heated from its unprinted side and is not heated sufficiently to cause more than the contacting surface of the thermoplastic sheet to be heated to its softening temperature upon pressure contact of the two sheets. The two sheets, while still in contact and with the printing composition between them, are then cooled to below the setting or hardening temperature of the printing composition, usually to about room temperature.

Due to the firm contact between the thermoplastic sheet and the non-elastic sheet, creeping and movement of any sort of the thermoplastic sheet with respect to the surface of the non-elastic sheet is prevented during the contacting and subsequent cooling steps so that the degree of register and definition of the printed design on the thermoplastic sheet is limited only by the degree obtainable in printing the non-elastic sheet. Furthermore, the printed surface of the thermoplastic sheet acquires substantially the contour of the non-elastic sheet and the smoothness of the printed thermoplastic sheet obtainable is determined to a large extent by the smoothness of the non-elastic sheet used. Actual fusion or bonding of the thermoplastic printing composition to the thermoplastic sheet is effected, the composition thus becoming an integral part of the sheet.

Following the heating and cooling steps, the printed thermoplastic sheet carried on the non-elastic sheet can be rolled up and stored or shipped, the non-elastic sheet serving as a backing sheet and offering considerable protection during this time. Alternatively, the printed thermoplastic sheet can be stripped from the non-elastic sheet following the cooling step and the non-elastic sheet can be re-used a number of times.

For better understanding of the invention, reference is made to the accompanying drawing in which, in the interest of clarity, certain features are shown on a somewhat exaggerated scale, and wherein Figure 1 is a schematic diagram showing one way in which the process can be carried out, Figure 2 is a schematic diagram showing additional features of the invention, Figure 3 is a fragmentary view in cross-section taken along the line III—III of Figure 2, and Figure 4 is a fragmentary view in cross-section of a printed thermoplastic sheet taken along the line IV—IV of Figure 2.

Referring now to Figure 1, a thin, flexible thermoplastic polyvinyl chloride sheet 6 produced by calendering a plasticized polyvinyl chloride composition, or in any other convenient manner, is fed, as over a tensioning and positioning roll 5, around a portion of the periphery of a roll 1, herein referred to as a "main" roll. The printed surface of a heated, substantially non-elastic sheet 7, printed on one surface 8 with a thermoplastic printing composition having a resinous base comprising polyvinyl chloride, is pressed into firm contact, as by a heated contacting roll 2, with the outer surface of the thermoplastic sheet 6 lying on the surface of the main roll 1. The two sheets are carried around the periphery of the main roll 1 at the same speed and in intimate contact with one another and are eventually led off the surface of the main roll 1, conveniently around a supplementary roll 3, and subsequently conducted to a wind-up roll 4. Conventional driving means, not shown, are provided for the several rolls in Figure 1 as well as in Figure 2.

The contacting roll 2, which effects pressure contact of the printed surface 8 of the non-elastic sheet 7 with the surface of the thermoplastic sheet 6, is preferably heated, e. g., by circulating hot liquid or gas through it, or electrically, or in any other convenient or conventional manner. The temperature of the heated contacting roll 2 is adjusted so that at the moment of contact of the two sheets, the thermoplastic printing composition on the surface of the non-elastic sheet 7 is in a softened plastic condition. The contacting of the heated, non-elastic printed sheet 7 with the thermoplastic sheet 6 under the heated contacting roll 2 serves to heat the surface of the thermoplastic sheet 6 sufficiently so that the ink is substantially pressed into its surface and is integrally bonded therewith. It is apparent that other means for heating the printed sheet, e. g., by passing it through a heated chamber, can be employed, if desired. The two sheets can be carried around the main roll 1, which is preferably unheated, for a sufficient distance to permit completion of the bonding process and, usually, to cause at least partial cooling to harden the printing composition, and are preferably given a final pressing together by the supplementary roll 3 before being conducted to a wind-up roll 4, or utilized otherwise.

In some instances, the supplementary roll 3 can, with advantage, be heated although in most instances it can, with advantage, be cooled. Generally, the distance between the supplementary roll 3 and the wind-up roll 4 is such that substantially complete cooling to room temperature of the composite structure 22, comprising the printed thermoplastic sheet adhering lightly to the non-elastic sheet, and substantially complete setting or hardening of the thermoplastic printing composition occurs before the wind-up roll is reached. Cooling rolls or other cooling means may be provided between the supplementary roll 3 and the windup roll 4, if desired. It is apparent that the operation can be carried out continuously and such continuous operation is limited only by the length of the thermoplastic sheet 6 or of the non-elastic sheet 7 which can be obtained.

In Figure 2, there are shown certain variations of the process as well as details of the printing step of the process. A thermoplastic polyvinyl chloride sheet 6 from a supply roll 26 is, as in Figure 1, conducted over a tensioning roll 5 and around the periphery of a main roll 1. An unprinted, substantially non-elastic sheet 14 from a supply 19 is conducted between printing rolls 9 and 10. One of the printing rolls 10 is engraved for intaglio printing and dips in a bath of a printing paste composition 12, having a thermoplastic polyvinyl chloride base, in a container 11 beneath the roll. Excess paste is removed by a doctor blade 13 and drains back into the container below.

After leaving the printing roll 10, the printed non-elastic sheet 7, with the paste in a wet or sticky state, is conducted through a hardening zone or chamber 24 wherein it can be heated to remove volatile solvents from the paste or otherwise treated as desired. The non-elastic sheet 7 with the hardened printing composition on its surface can then be rolled up and stored for subsequent use as described in connection with Figure 1 or conducted directly from the hardening zone to the heating and contacting roll 2. In certain instances, the chamber 24 can, with advantage, be replaced with heated or cooled rolls contacting the unprinted surface of the sheet to accomplish substantially the same purpose.

After removal from the main roll by the supplementary roll 3, the composite structure of the two sheets can, if desired, be conducted through a second zone or chamber 20 where its temperature can be further adjusted to the desired degree. The cooled composite structure of the two sheets can, as mentioned in connection with Figure 1, be conducted to a wind-up roll and stored for future use, or the printed thermoplastic sheet can be stripped from the non-elastic sheet, leaving the latter free of printing composition, and each sheet conducted to separate wind-up rolls for storage. In the modification shown in Figure 2, the cooled composite structure 22 is conveyed between a pair of rolls 15 and 16 and the printed thermoplastic sheet 21 and the clean non-elastic sheet 14 then led away from the rolls at a divergent angle to wind-up rolls, 17 and 18 respectively. The roll of recovered non-elastic sheet on wind-up roll 18, can, if desired, be removed at frequent intervals and substituted for the supply roll 19 and the sheet thus re-used.

The structure of the composite sheet 22 prior to stripping the printed thermoplastic sheet from the non-elastic sheet is illustrated by the fragmentary cross-section of Figure 3 wherein a non-elastic sheet 14 is shown in intimate contact with the surface of a thermoplastic polyvinyl chloride sheet 6, the polyvinyl chloride base printing composition constituting the design 23 on the surface of the thermoplastic sheet 6 being bonded to and integral with the sheet.

The structure of the printed thermoplastic polyvinyl chloride sheet 21 after it has been stripped from the non-elastic sheet 14 is illustrated by the fragmentary cross-section of Figure 4 wherein the thermoplastic sheet 6 carries the printing composition 23 constituting the design on one of its surfaces bonded to and integral with the thermoplastic sheet, the entire structure presenting a uniform, smooth, unblemished surface.

It is apparent from the foregoing description of the invention that the non-elastic sheet can be printed with substantially any desired design and that multi-colored polyvinyl chloride base printing pastes can be used. In the latter instance, a pair of printing rolls, duplicating printing rolls 9 and 10, can be used for each color of paste in conventional manner. In such instance, the first printing should be treated, as described, to harden the paste before the second color is applied. In this manner, bleeding of one color into another is avoided. It is also apparent that the same result can be obtained by printing the thermoplastic sheet first with a design in one color, as has been described, and then with a design in another color after it has been stripped from the non-elastic sheet. The non-elastic sheet can be printed by rotogravure, hand painting, screen printing or other equivalent intaglio process.

It is also apparent from the preceding description that the substantially non-elastic backing or carrier sheet can be composed of any one of a number of substances, it being only necessary that it be substantially non-elastic at the bonding temperature and that it be strong enough and have sufficiently poor adhesion for the hardened thermoplastic printing composition and thermoplastic sheet to enable it to be stripped easily from the cold printed thermoplastic sheet. Carrier sheets which have been used with entire satisfaction include thin sheets of strong fibrous material with a non-absorptive surface, such as glassine, silicate coated paper and many others. Non-thermoplastic resinous sheets of various sorts, such as regenerated cellulose, can also be used, but suffer from the disadvantage of being easily torn and often difficult to strip from the printed thermoplastic sheet. A paper base carrier sheet is preferred due to its low cost and low degree of elasticity. Thin metal sheets can be used, if desired.

Although the method of the invention is capable of considerable variation in certain respects, certain essential features should be understood thoroughly. The thermoplastic polyvinyl chloride sheet can be formed in any convenient way but should be of composition generally thought of as being suitable for calendering into sheets. Such compositions usually contain at least 50 per cent by weight, and often as much as 90 to 95 per cent, of polyvinyl chloride based on the resinous content of the composition. The composition can contain substantial proportions of polymerized vinyl acetate, vinylidine chloride, acrylonitrile or other resin compatible with polyvinyl chloride either by co-polymerization or by compounding therewith, as well as combinations thereof. Such compositions are ordinarily referred to as "high molecular weight" polyvinyl chloride compositions and are of limited solubility in many organic liquids. Thermoplastic polyvinyl chloride sheets of substantially any thickness can be used in the process of the invention.

It is also essential that the composition from which the thermoplastic sheet is made be suitably plasticized to impart sufficient flexibility thereto. Generally speaking, the composition should contain less than about 45 per cent and more than about 15 per cent, preferably from about 25 to about 40 per cent, of plasticizer, depending upon the particular resinous composition and the particular plasticizer employed. Plasticizers which can be employed include dioctyl phthalate, dibutyl phthalate, dioctyl sebacate, tricresyl-phosphate, modified alkyd resins and many others well known in the art as being employed frequently in polyvinyl chloride compositions which are to be calendered into sheets. The terms "plasticized polyvinyl chloride sheet" and "plasticized thermoplastic polyvinyl chloride composition" as used herein are to be interpreted as referring to sheets or compositions having the characteristics as to resin and plasticizer content just described.

The thermoplastic polyvinyl chloride composition used in preparing the printing paste used in the method of the invention differs in certain important respects from the composition used in making the thermoplastic sheet. Although the same resins and proportions thereof as mentioned in the description of the thermoplastic sheet can be used, and in many instances preferably are used in preparing the printing paste, the resinous component of the printing composition is unplasticized and is of the type ordinarily referred to as a "low-molecular weight" polymer or co-polymer. Such substances have generally a lower softening temperature than the high-molecular weight polymers used in the thermoplastic sheet and are more soluble in many organic solvents. The printing paste is prepared by dissolving the low molecular weight resin base in an organic liquid, such as methyl ethyl ketone, methyl isobutyl ketone, mesityl oxide, cyclohexanone or other known solvent for such resin mixture, and incorporating a pigment therewith. Suitable pigments include titanium dioxide, monastral blue and green, cadmium yellow, molybdate orange, other phthalocyanine blues and greens, chrome colors and many others. Soluble colors are to be avoided. The printing paste is made up without the use of a plasticizer to a suitable printing consistency and usually contains from 10 to 30 parts by weight of resin to each 90 to 70 parts of solvent. Diluents, such as toluene, can be included, if desired. Pigments are included to give the shade desired and may vary from small amounts up to as much as two pounds or more per gallon of paste. The printing composition and the thermoplastic sheet should be of such compositions as to be bondable with one another.

By avoiding the use of a plasticizer in the printing composition, an unusually "dry" print is obtained on the carrier or transfer sheet and the printed sheet can be rolled up tightly and stored indefinitely without danger of sticking.

When a plasticized thermoplastic polyvinyl chloride sheet is printed with such an unplasticized printing composition, sufficient of the plasticizer from the thermoplastic sheet diffuses into the thin layer of printing composition during the bonding of the two, or even later upon standing, to plasticize the printing composition. If a plasticizer is used in making up the printing paste, it has been found that invariably the printed design tends to become tacky upon standing and many attendant difficulties result.

Special attention is directed to the importance of using a thermoplastic printing composition having a softening temperature not substantially higher, e. g., not more than about 10° C. higher, than the softening temperature of the thermoplastic sheet. This is especially true in the case of thin thermoplastic sheets, e. g., sheets not more than about 4 to 6 mils thick. If such condition is not observed sufficient heat will be stored in the non-elastic sheet and printing composition prior to contact thereof with the thermoplastic sheet to cause the latter to soften to such a degree as to interfere seriously with the process. Generally speaking, it is preferable to use a polyvinyl chloride resin in the printing composition having a softening point substantially below that of the thermoplastic sheet.

In a typical instance of the operation of the process, a printing paste was prepared by dissolving 20 parts by weight of an unplasticized low molecular weight resin containing about 95 per cent polyvinyl chloride and about 5 per cent of polyvinyl acetate in 100 parts of methyl ethyl ketone. Titanium dioxide was included as a pigment at the rate of about 1.5 pounds per gallon. The paste composition was used in a rotogravure press to print a design on a continuous sheet of glassine. The printed glassine sheet was dried to remove the methyl ethyl ketone by evaporation and the dry printed glassine sheet was then conducted around a roll heated a few degrees above the softening temperature of the printing composition forming the design on the sheet and then contacted under pressure with the surface of a calendered high molecular weight thermoplastic polyvinyl chloride sheet 4 mils thick and having a composition approximating 62 per cent of polyvinyl chloride, 3 per cent of polyvinyl acetate and 35 per cent of dioctyl phthalate as a plasticizer. The softening temperature of the thermoplastic sheet was about 5° C. higher than that of the printing composition on the glassine sheet. The contacted sheets were then cooled to room temperature and without separating, were rolled up and stored. They were subsequently stripped from one another and the glassine sheet, which was free of polyvinyl resin, was re-used. The printed thermoplastic sheet was characterized by substantially unchanged feel and appearance, showed no signs of creeping or drawing having occurred during the process. The white design was integrally bonded to the sheet and the definition was sharp and clear. The design was free of tackiness and the printed sheet could be rolled up and stored without sticking.

Similar results were obtained when the glassine sheet was printed in multiple color on a multicolor press, the thermoplastic sheet emerging carrying a multi-color design having a high degree of accuracy in register and sharp definition.

Although the invention has been described with special reference to a printing paste containing a volatile solvent, it should be pointed out that one modification of the invention contemplates the employment of the polyvinyl chloride printing composition mixed in a fused or molten state with a pigment and without the use of a volatile solvent, but using suitably heated printing rolls 9 and 10. In such instance, the printed, non-elastic sheet 7 carrying the printed design in reverse on one of its surfaces 8, can be conducted directly and without substantial cooling from printing roll 10 over a contacting roll 2 into pressure contact with the thermoplastic sheet 6 and the two sheets then carried around a portion of the periphery of a main roll 1, as previously described. In this way, the hardening step and subsequent softening step as carried out in the hardening zone or chamber 24 and subsequently, is avoided.

Although the process of the invention has been described as being carried out continuously, it is apparent that it is equally applicable to the printing of individual flat thermoplastic sheets using conventional plate type presses, one plate of which can be heated to the desired degree.

The term "printing composition" as used herein refers to the hardened composition comprising a polyvinyl chloride resin and pigment as carried on the non-elastic flexible sheet, but does not include the volatile solvent present in the printing paste. The term "printing paste" as used herein refers to the paste comprising a polyvinyl chloride resin, a pigment and a volatile solvent as used in the printing step. The term "polyvinyl chloride resin" as used herein refers to polymers and co-polymers of vinyl chloride within the limits herein defined.

We claim:

A process for the continuous printing of a flexible thermoplastic polyvinyl chloride sheet which comprises: printing a continuous, flexible, substantially non-elastic sheet having a substantially non-absorbable surface with an unplasticized printing ink composition comprising between approximately ten and approximately thirty parts by weight of a thermoplastic polyvinyl chloride resin having a softening point of not more than approximately ten degrees centigrade higher than the softening point of the polyvinyl chloride sheet that is to be printed; drying the print thereon; heating the sheet and print thereon to a temperature slightly above the softening temperature of the resin printing composition; contacting the resulting sheet having the print contained thereon with an unheated sheet of a flexible thermoplastic polyvinyl chloride; cooling the contacted sheets to approximately room temperature, and, stripping the non-elastic sheet from the printed thermoplastic sheet.

LELAND H. SMITH.
FRANK M. SMITH.

REFERENCES CITED

The following references are of record in the file of this patent:

UNITED STATES PATENTS

| Number | Name | Date |
|---|---|---|
| 2,215,595 | Saunders | Sept. 24, 1940 |
| 2,275,957 | Groff | Mar. 10, 1942 |
| 2,404,073 | Karfiol | July 16, 1946 |
| 2,407,549 | Gurwick | Sept. 10, 1946 |

FOREIGN PATENTS

| Number | Country | Date |
|---|---|---|
| 562,573 | Great Britain | July 6, 1944 |